(12) United States Patent
Lu

(10) Patent No.: US 6,952,794 B2
(45) Date of Patent: Oct. 4, 2005

(54) METHOD, SYSTEM AND APPARATUS FOR SCANNING NEWLY ADDED DISK DRIVES AND AUTOMATICALLY UPDATING RAID CONFIGURATION AND REBUILDING RAID DATA

(76) Inventor: Ching-hung Lu, No. 105, Tao Ying Rd., Tao Yuan (TW)

( * ) Notice: Subject to any disclaimer, the term of this patent is extended or adjusted under 35 U.S.C. 154(b) by 315 days.

(21) Appl. No.: 10/269,186

(22) Filed: Oct. 10, 2002

(65) Prior Publication Data

US 2004/0073747 A1 Apr. 15, 2004

(51) Int. Cl.[7] .............................................. G06F 11/00
(52) U.S. Cl. .............................. 714/7; 714/6; 711/114; 711/162
(58) Field of Search ............................... 711/114, 162; 714/6, 7; 369/30.06; 719/325

(56) References Cited

U.S. PATENT DOCUMENTS

| | | | | |
|---|---|---|---|---|
| 5,471,640 A | * | 11/1995 | McBride | 710/22 |
| 5,822,782 A | * | 10/1998 | Humlicek et al. | 711/170 |
| 6,023,780 A | * | 2/2000 | Iwatani | 714/770 |
| 6,092,169 A | * | 7/2000 | Murthy et al. | 711/170 |
| 6,098,119 A | * | 8/2000 | Surugucchi et al. | 710/10 |
| 6,647,514 B1 | * | 11/2003 | Umberger et al. | 714/42 |
| 6,754,767 B2 | * | 6/2004 | Gold | 711/114 |
| 2002/0101711 A1 | * | 8/2002 | Gold | 361/685 |
| 2002/0156944 A1 | * | 10/2002 | Benhase et al. | 710/8 |
| 2003/0070043 A1 | * | 4/2003 | Merkey | 711/114 |

\* cited by examiner

Primary Examiner—Hong Kim
(74) Attorney, Agent, or Firm—Marcus G. Theodore

(57) ABSTRACT

The present invention pertains to a computer software implemented method, system, and apparatus for automatic updating disk drive configuration and rebuilding RAID data to assure proper data storage in a RAID configured system. The computer software implemented configuration mechanism utilizing CPU and memory of a computer system automatically generates a full configuration of the disk drives connected to system peripheral bus both at system initialization time and runtime. The configuration mechanism uses a computer-implemented procedure for scanning a newly added disk drive, detecting conflict to the existing configuration, resolving conflicts, finding a proper target referenced or ruined disk drive, replacing this target disk drive with the newly added disk drive, rebuilding the RAID data into the added disk drive, updating RAID configuration with the added disk drive, and presenting to the host operating system the current configuration information.

22 Claims, 9 Drawing Sheets

METHOD, SYSTEM AND APPARATUS FOR SCANNING NEWLY ADDED DISK DRIVES AND AUTOMATICALLY UPDATING RAID CONFIGURATION AND REBUILDING RAID DATA

BACKGROUND OF THE INVENTION

1. Field

The present invention relates generally to the control of computer storage peripherals. More particularly, the invention relates to a computer software implemented method, product, and apparatus for scanning newly added disk drives and automatically rebuilding the configuration and configured data of a Redundant Array of Independent Disks (RAID) information.

2. State of the Art

Currently, many large data storage systems adopt a RAID approach. RAID is used for improving the I/O performance and data protection of mass storage devices. The advantage of using RAID technology, which groups disks with small storage capacity together to store a large amount of data and performs data access across multiple disks, lies in the fact that it can replace the use of an expensive large disk for data storage. At the same time, it can improve the efficiency of data throughput because the data access is performed only on each involved small disks. In other words, dividing data storage information into many small logical disk drive units in disk drives configured by RAID technology can not only reduce the cost but also speed up the access to the desired data distributed among various disk drives.

In a RAID configured environment, when some disk drives connected to the computer system have been ruined or disconnected, a user then connects new disk drives to restore the stability of the system. In order to maintain the consistency of data storage, the user rebuilds a new RAID configuration and integrates the configured data of those ruined and disconnected disk drives into the new configuration.

RAID technology is associated with RAID levels. Different levels provide different methods for creating redundant information for disk drives. When a disk drive is ruined or disconnected, redundant configured data is generated. This redundant data can be used to rebuild the configuration information completely according to the method provided. In general, there are four RAID levels but not limited to these four that are commonly used in the RAID technology, they are the RAID 0, RAID 1, RAID 5, and RAID 5 with hot spare, each provides various degrees of protecting data loss and capacity in data storage.

RAID 0 uses "stripping" where the data is distributed among a number of strips, which are stored across the disk drives in the array. This technique provides an approach for the simulation of a huge disk drive using as many as possible small disk drives to improve the performance of data accessing, but this technique provides no redundancy for the recovery of disk drives failure.

RAID 1 uses "mirroring" where each unit of data is duplicated to mirror onto another disk to protect data loss. The advantage of mirroring is that it provides very strong data protection. The drawback with mirroring is that it requires extensive disk storage redundancy achieving an efficiency of only half capacity of the storage system, even if there are n disks employed but only the mirrored one is used.

RAID 5 uses "parity" to configure a disk for the data redundancy. Each time an array is written in with configured data, RAID 5 generates redundant data to correspond to the written data and then stores the redundant data in a disk drive of equivalent size to that of one average disk drive. Consequently, if there are n disk drives in the array, there will be roughly n-1 disk drives space capacity for regular data storage. The advantage of this technique is that it offers fast throughput for small data files.

RAID 5 with spare uses one more disk drive to store redundancy in addition to the one that stores the generated redundancy by RAID 5. If there are n disk drives in the array then there will be n-2 disk drive space capacity for regular data storage. This technique provides a stronger data protection than that of RAID 5 alone, and, at the same time, enjoys the same advantage of RAID 5.

There are two storage types: simple and span, which are not associated with RAID level, these non-RAID types of storage unit are also included in the present invention. Simple uses continuous space on a disk drive without redundancy data. Span concatenates storage units of simple type as a logical storage unit. The logical storage unit of type span has no redundancy data but provides flexibility for utilizing storage space.

A typical data storage system can contain a number of storage disks with drives. Storage of the configuration information associated with each disk drive may be arranged into logical disk drives or volumes with various RAID or non-RAID levels. A logical disk drive or a volume is formed by sub-drives of physical disk drives in a same disk drive group, and the volume layout structure of a disk drive group can be described by the constituent logical disk drives and structure of volumes in the group.

A RAID controller is a device that can be used to manage one or more arrays of RAID configured disk drives. However, if a system contains no RAID controller then a software program stored in the memory of a host computer can be implemented to behave as a RAID controller. Or, a computer software program can be implemented utilizing a CPU and memory of a computer system, including the CPU and memory of a RAID controller to manage the configuration of disk drives. The computer software program is for the purpose of configuring the physical disk drives in a computer system into logical disk drives where each logical drive is managed according to the associated RAID levels.

RAID configurations are complex and difficult to use when dealing with problems encountered in real applications. Part of the reason for these problems is that there are many possible ways to achieve a RAID configuration. Therefore, extensive knowledge and time is required of a user resolving the RAID configuration. Several RAID configuration methods have been proposed, such as Humlicek et al, U.S. Pat. No. 5,822,782 entitled, "Methods and Structure to maintain raid configuration information on disks of the array"; and Murthy et al, U.S. Pat. No. 6,092,169 entitled, "Apparatus and Method for storage subsystem drive movement and volume addition". These two references solve a portion of the problem encountered in the application of the RAID configuration. However, their techniques are far from achieving the goal of an automatic RAID configuration.

Surugucchi et al, U.S. Pat. No. 6,098,119 entitled, "Apparatus and Method that automatically scans for and configures previously nonconfigured disk drives in accordance with a particular raid level based on the needed raid level" provides a technique that attempts to alleviate user input by automatically configuring both configured and un-configured disk drives at both system boot up and during runtime. However, this automatic configuration feature is very limited in dealing with the problems encountered during real applications. For example, in a real application when drive A leaves the system and drive B adds to the system to replace drive A; since both drives belong to the same disk drive group, both drives still retain their unique configuration identifiers. If later when drive A reenters the system, drive B has a new updated configuration information. Therefore, drive B instead of the drive A would be chosen for the configuration of the system. However, the method of Surugucchi et al, uses a set of combination rules according to small computer system interface (SCSI) channel and target identifiers as criterion for the selection of a disk drive among conflicted disk drives. These rules are dependent on RAID channels. They are not general enough to cover the users' expectation in real applications. Thus, in such a case, the Surugucchi et al method may not choose drive B for RAID configuration. Besides, in real applications, a storage system is usually connected to many different types of devices such as SCSI devices, Integrated Device Electronics (IDE) devices, and internet Small Computer System Interface (iSCSI) devices together, which make combination rules even more complicated and difficult to manage.

Accordingly, there exists a need for rebuilding a new RAID configuration when added disk drives are scanned and detected in real application to provide an automatic RAID configuration mechanism that can accommodate various types of RAID level configurations for a storage system having various physical dimensions. The device and method described below, provides such an invention.

SUMMARY OF THE INVENTION

The present invention is an apparatus and method utilizing a CPU and memory for the automatic update of disk drive configurations and the rebuilding of RAID data to assure proper data storage in a RAID configured system. The method consists of a computer implemented procedure for: a) scanning disk drives connected to a computer system peripheral bus, b) detecting newly added disk drives connected to the peripheral bus, c) resolving conflicts where selection of only one disk drive among conflicted disk drives is needed, d) updating the original RAID configuration and rebuilding RAID data of disk drives, and e) presenting to the host system the updated RAID configuration information.

In accordance with one aspect of the present invention, the disk drive configuration information includes at least four parts. They are: 1) an identifier to identify a disk drive group so that each disk drive in the group has a same unique disk drive group identifier, 2) an update counter to accumulate the number of times a disk drive has been involved in the operation of RAID configurations, 3) a volume layout structure database with information as to the group where the disk drive belongs, and 4) a storage database with information of the sub-drives of a disk drive. The volume layout structure database further includes how the logical disk drives or volumes associated with RAID levels in a disk drive group are formed or structured. The storage database information of the sub-drives of a disk drive further includes physical location and size of each of the sub-drives in the disk drive. All disk drives in the same disk drive group contain same copy of configuration information except each disk drive has its own identifier in addition to the same group identifier.

In accordance with another aspect of the present invention, the update count of a disk drive in a disk drive group is increased by one if another one in the group is disconnected from the system peripheral bus. In this operation, the update count and the unique disk drive group identifier of the disconnected drive remains intact. Therefore, later on when a new disk drive is added to replace the disconnected disk drive at the same configuration location, the update count of each disk drive in the disk drives group is increased by one again. Hence, the larger the update count, the newer the configuration of the disk drive. The method of the present invention thus uses a update counter installed in a disk drive to represent the chronology of the disk drive configuration information and provides a guide for resolving conflicts by choosing from among the conflicted disk drives a disk drive with the highest update count to represent all conflicted disk drives. The update count approach guarantees that the newly connected disk drive always has the highest priority to represent a new configuration.

In accordance with yet another aspect of the present invention, it rebuilds RAID data for a newly added disk drive found from the un-configured disk drive groups to replace a qualified referenced disk drive. The rebuilding process copies the configuration information from the disk drive group of the referenced disk drive to the newly added disk drive, rebuilds RAID data into the newly added disk drive according to the sub-drive layout of the referenced disk drive and eliminates the referenced disk drive from its disk drive group.

In accordance with further aspect of the present invention, a computer implemented system method is provided for automatic updating the configuration information and rebuilding RAID data of disk drives connected to a computer system peripheral bus at system initialization time and runtime of a storage system. The software product uses computer-implemented system initialization time and runtime configuration procedures to configure the disk drives, where each disk drive has various parameter settings including the configuration information to be configured in accordance with one or more RAID levels and the RAID data of sub-drives associated with how each disk drive was subdivided.

The system initialization time configuration procedure is used to scan all disk drives accommodated with previous existing configurations. It configures un-configured disk drives in accordance with a conflict resolving strategy that also considers the existing configuration information of disk drives whose parameter settings provide a guide to select an appropriate RAID configuration suitable for optimizing the overall performance of the storage system.

The runtime configuration procedure is used to detect newly added disk drives connected to the computer system peripheral bus while the system is in operation. The newly added disk drives can be either disk drives belonging to part of an existing configuration or can be un-configured disk drives. The runtime configuration procedure incorporates newly added disk drives into the current RAID configuration to replace dead or referenced disk drives.

DESCRIPTION OF THE ILLUSTRATED EMBODIMENTS

Figure 1:
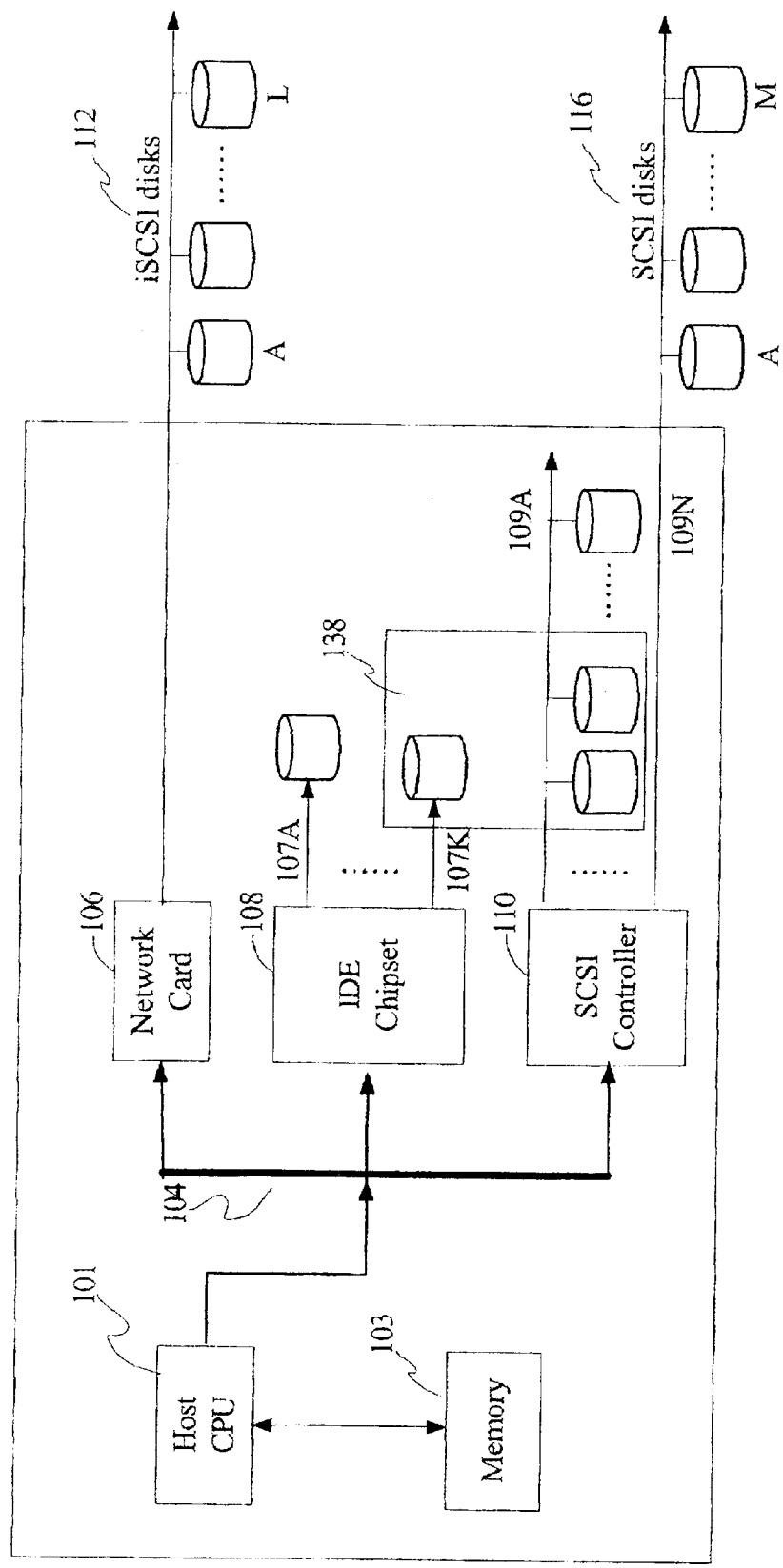
FIG. 1 illustrates a preferred embodiment of a RAID configuration storage system.

FIG. 1 illustrates a RAID configured storage system, which provides a disk storage software system environment particularly suitable for implementing a preferred embodiment of the present invention. In the figure, there is a computer system 100, in which a system peripheral bus 104 is connected to all disk drivers. The computer implemented software program of the present invention logs into the memory 103 so that together with the CPU 101, a RAID configured storage system is formed. A system peripheral bus 104 is then connected to an SCSI device 110, an IDE chip 108, and a network card 106. The SCSI device may have one or more channels 109A–109N. Similarly, the IDL may have one or more channels 107A–107K connected to IDE disks respectively.

Each SCIS channel 116 contains one or more peripheral storage devices 116A–116M such as, but not limited to, disk drives, tape drives, optical disk drives, and the like, hereinafter all referred to disk drives. Similarly, the iSCSI disk drives 112A–112L and the IDE disk drives 107A–107K are hereinafter all referred to as disk drives. A SCSI channel 109A can be used to access peripheral devices located within the host computer system 100. A SCSI channel 109N can be used to access peripheral storage devices external to the host computer system 100. Each IDE channels is used to access IDE disk drives within the host computer system. A network card is used to access iSCSI disk drives external to the host computer. As the operation of SCSI, IDE, and iSCSI drives are well known in the art, their details will not be described further.

Figure 2:
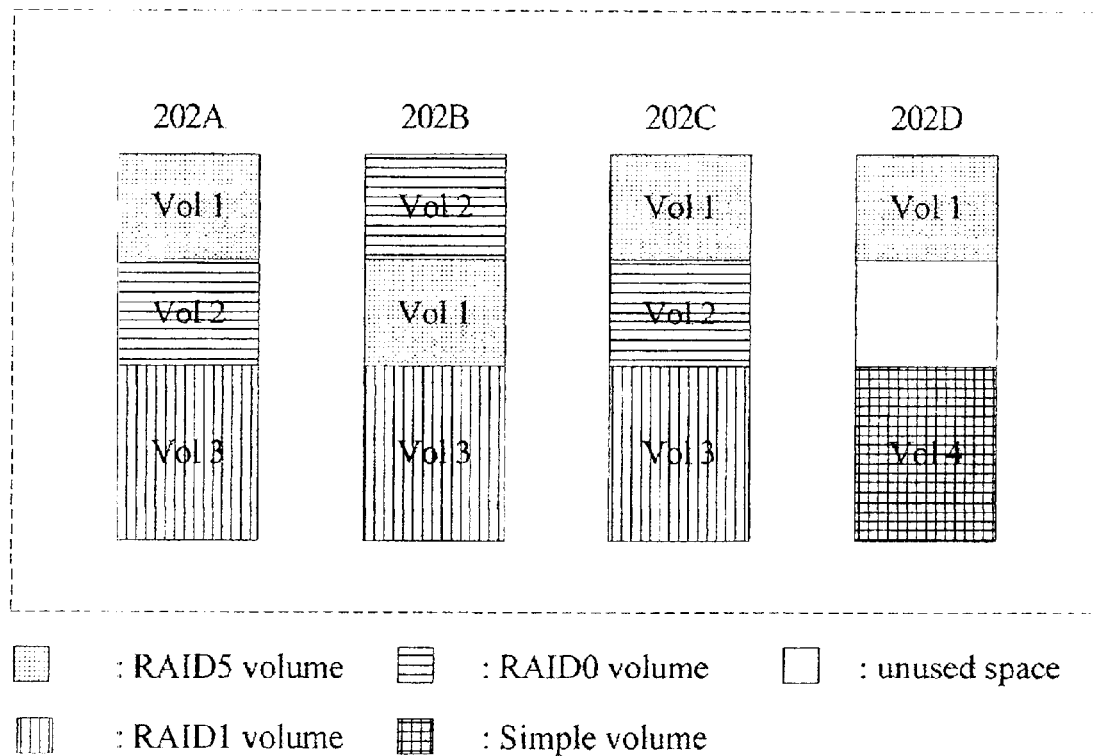
FIGS. 2A and 2B illustrate exemplary disk drives group of the preferred embodiment of FIG. 1.
Figure 2:
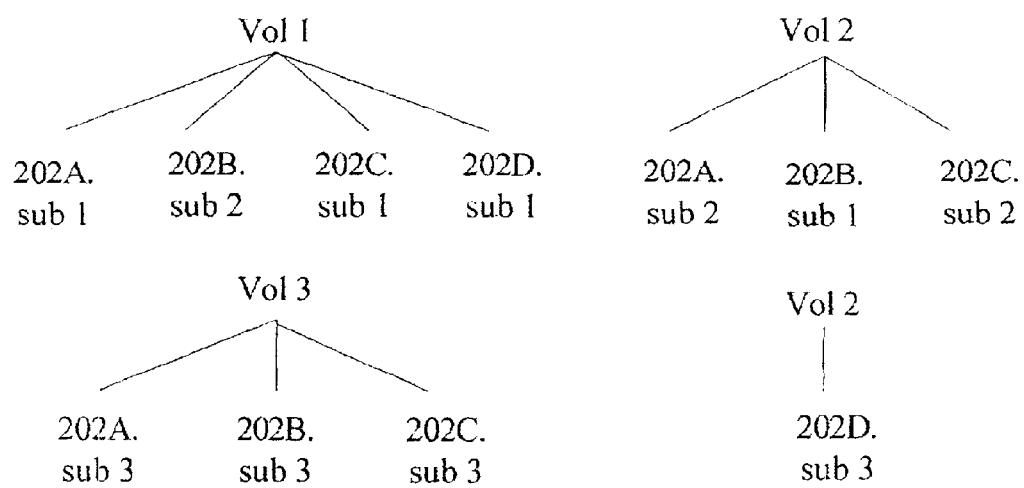

The foregoing describes a computer storage system utilizing the RAID configuration technology of the present invention. The following preferred embodiment shown in FIG. 2 is used for manual RAID configuration procedures. FIG. 2 illustrates how the configuration information and RAID data of a disk drive are formed. A user initiates a disk drive group 200 created in a manual RAID configuration procedure. The disk drive group may include one or more physical disk drives across different RAID devices and channels, such as the disk drive group 138 of FIG. 1. Each disk drive in the group can be divided into sub-drives to construct logic disk drives or volumes to configure each disk drive in the group. A volume is a logic disk drive, which represents that portion of a disk drive group seen by the host operating system as a single drive.

There can be one or more volumes associated with a particular drive group created by a user. For example, as shown in FIG. 2(a), the disk drive group 200 includes four physical disk drives 202A–202D with four associated logic disk drives, Volume 1–Volume 4. As shown in FIG. 2(b), Volume 1 is formed by four sub-drives spanning across a designated portion of each physical disk drive 202A, 202B, 202C, and 202D, i.e., the first sub-drive of disk drive 202A, the second sub-drive of disk drive 202B, the first sub-drive of disk drive 202C, and the first sub-drive of disk drive. Similarly, Volume 2 and Volume 3 are formed by portions of disk drives 202A, 202B, and 202C, respectively. Volume 4 is formed by the third sub-drive of the disk drive 202D, with its second sub-drive unused.

Each volume within a disk drive group is associated with a RAID level. For example, as shown in FIG. 2(a), Volume 1 is a collection of sub-drives where each has the same RAID 5 level associated with it. Volume 2 is a collection of sub-drives having the same RAID 0 level. Volume 3 a collection of sub-drives having the same RAID 1 level. Volume 4 a sub-drive of having a simple (non-RAID) volume.

Each logical drive or volume within a disk drive group is ordered. This order is derived when a user creates volumes in a disk drive group in sequence. For instance, suppose the disk drive group 200 is a first created disk drive group, then Volume 1 created in the first disk drive group is considered the first logical disk drive, Volume 2 the second logical disk drive, Volume 3 the third logical disk drive, Volume 4 the fourth logical disk drive, and so forth. In the preferred embodiment, only non-RAID, RAID 0, RAID 1, RAID 5, and RAID 5 with spare are supported. A user can select different RAID levels to specify RAID configuration, each of RAID levels provides a various degree of data loss protection and data storage capacity.

Once a new configuration has been completed, the RAID configuration information and RAID data of each disk drive in each disk drive group in sequence are properly stored and rebuilt in a new configured storage system. The logical disk drives of the new storage system are then initialized for the computer system 100 to present the overall configuration information to the host operating system.

The foregoing description has described general RAID configuration steps that can be used by a user to manually configure the disk drives connected to a system peripheral bus and the terminology used in the preferred embodiment of the present invention.

The following provides illustrative embodiments of the method and procedures used in configuring the disk drives in an automatic RAID configuration storage system.

An automatic RAID configuration approach to configure the disk drives connected to the system peripheral bus is needed in two occasions: 1) at system initiation time and 2) at system runtime. A system initiation time configuration procedure is initiated when the system turns on the computer implemented software program of the present invention and enters into the host operating system. The run-time configuration procedure is used to alter the configuration at runtime when new added disk drives are detected. At runtime, the system peripheral bus is initiated to service the I/O activity of the storage system.

Figure 3A:
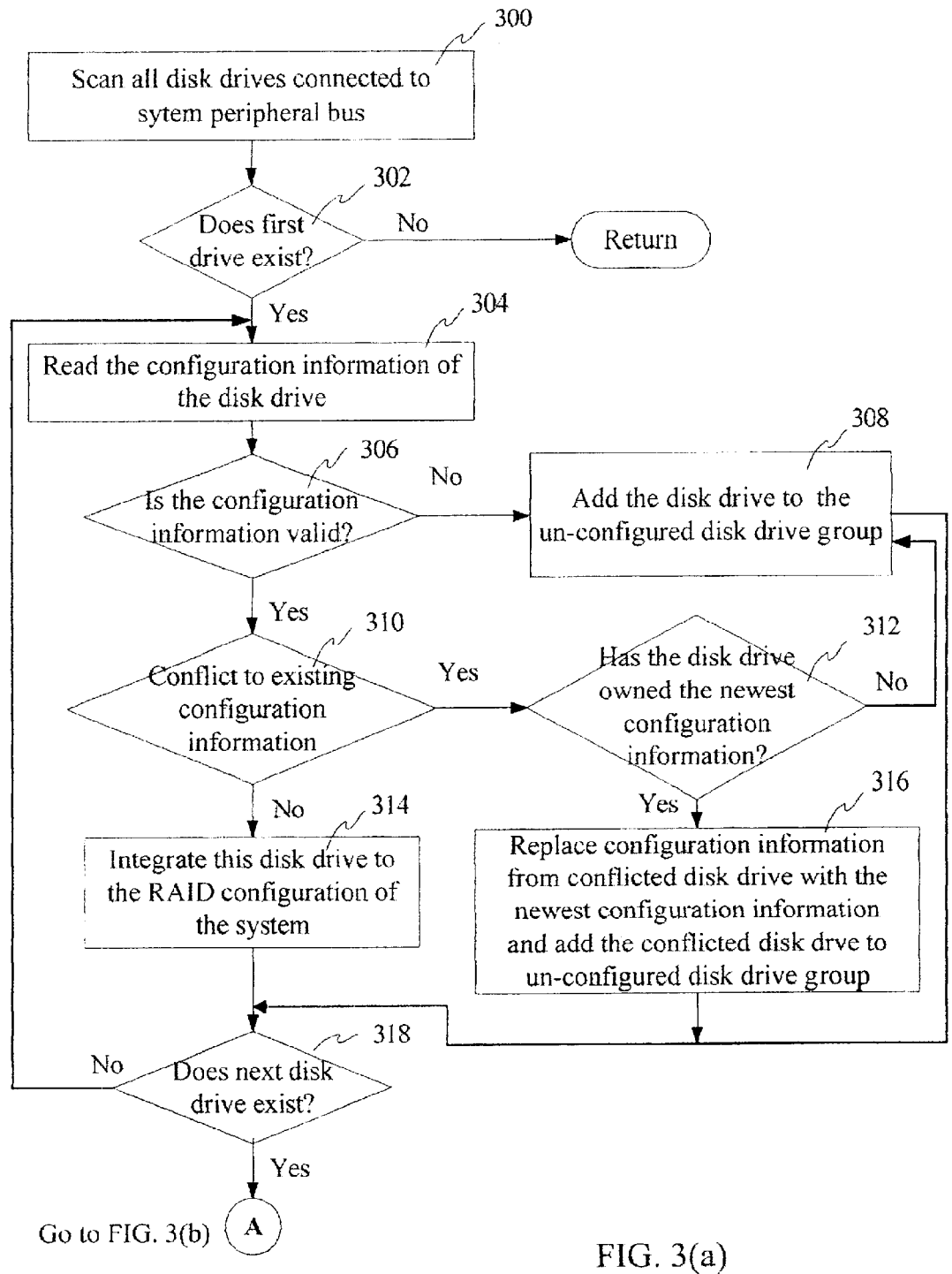
FIGS. 3(a) and 3(b) are flow charts of a preferred embodiment illustrating the steps used in the system initialization time configuration procedure.
Figure 3B:
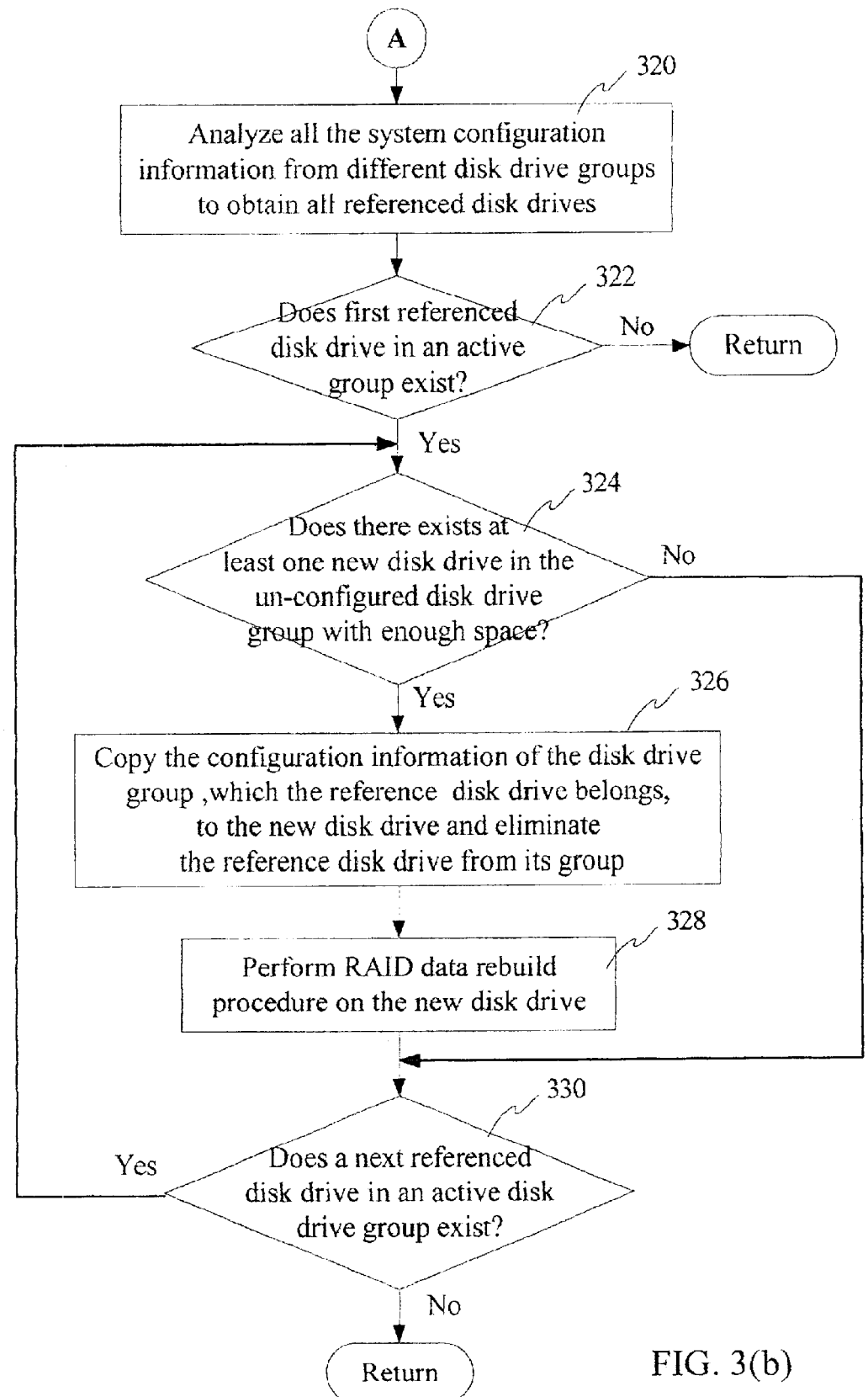

An automatic configuration procedure at system initialization time is used to scan all disk drives connected to the system peripheral bus, to read configuration information from each disk drive, and to update configuration information according to the status change of disk drives. The status change may arise due to removal of the disk drives, or ruined of disk drives, or new added disk drives disconnected from other system and connected to the system, or brand-new disk drives connected to the system. FIG. 3 shows the steps used by an automatic system initiation time configuration procedure in accordance with a preferred embodiment. At system initialization, the computer implemented software program starts to scan from the first disk drive in the first disk drive group and continues the procedure until the last disk drive in the last group connected to the system peripheral bus is scanned. If the configuration information of a disk drive is valid and it does not conflict to that of a existing disk drive in overall system configuration, then this disk drive is integrated into configuration of the system.

Figure 4:
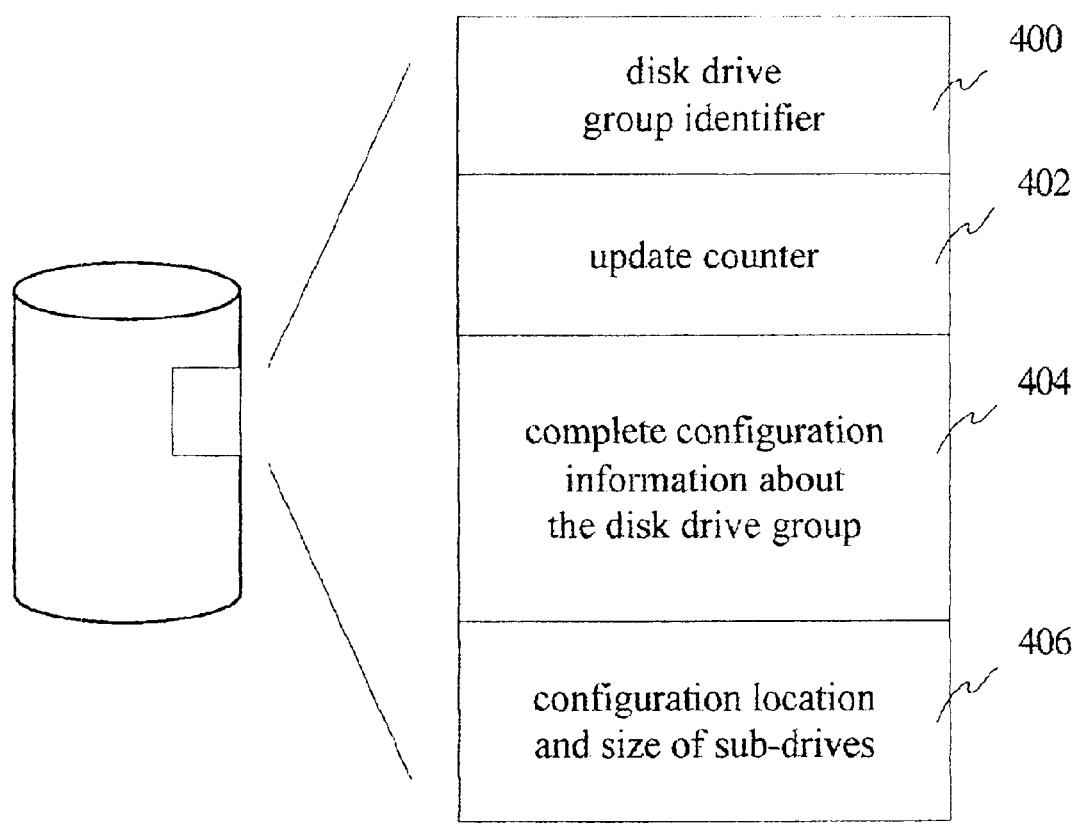
FIG. 4 illustrates a preferred embodiment of the configuration information stored in a disk drive.

FIG. 4 shows the configuration information stored in a physical disk drive in accordance with a preferred embodiment of the invention. They have parameters set for a RAID configuration both at system initialization and runtime. The disk drive group identifier 400 identifies each disk drive of a disk drive group created by a user. It is noted that the disk drives in a group may be selected across different RAID devices and channels such as the one shown in the disk drive group 138 of FIG. 1. Each disk drive in the same disk drive group has the same unique disk drive group identifier. A user may disconnect disk drives in a group and later reconnect some of them to the system peripheral bus. In this case, the unique disk drive group identifier remains intact in the disconnected disk drives. If they are reconnected to the same configuration location, the unique disk drive group identifier can be used again. Otherwise, the disk drive group identifiers associated with the reconnected disk drives are subject to change. Similarly, when a newly added disk drive is connected to a system peripheral bus to join a disk drive group, the newly added disk drive will be assigned with the same unique disk drive group identifier.

A conflict occurs when two or more disk drives are going to compete with each other to own the same configuration location. Should there be a conflict, a criterion is needed to decide from among the conflicted disk drives a proper disk drive to resolve the conflict. An update counter 402 is designed for resolving these conflicts in accordance with a preferred embodiment of the present invention. The update counter 402 counts the number of operative actions of configurations, which took place to the disk drive. The initial value of the update counter 402 is set to zero and increased by one each time an operative action for configuration takes place to the disk drive. Note that the update counter counts the number of configuration changes to a disk drive under consideration, which is independent of the RAID interface devices and channels being used. This update counter 402 is particularly useful for resolving a conflict where a disk drive with newer configuration information is needed.

The storage area 404 stores the volume layout structure of the disk drive group, which a disk drive belongs, in accordance with a preferred embodiment of the present invention. Volume layout structure indicates how each logic disk drive in a disk drive group is formed. For example, FIG. 2(*a*) shows a disk drive in the disk drive group 200 divided into sub-drives where each sub-drive is assigned with a RAID level. The configuration information of the disk drive 202A contains a volume 1 of type RAID 5, a volume 2 of type RAID 0, and a volume 3 of type RAID 1. FIG. 2(*b*) shows how each volume is formed by combining the same RAID level labeled sub-drives distributed in each disk drive in the disk drive group 200. Therefore, FIG. 2 shows the volume layout structure of each disk drive in disk drive group 200. The storage area 406 stores the initial addresses and sizes of each divided sub-drives of a disk drive. A volume is composed of divided sub-drives of disk drives in a same group with a same RAID level.

Referring to FIG. 3(*a*), as the system boots up and scans all disk drives connected to system peripheral bus for configuration information, the step 302 checks if there exists the first disk drive. If there is no such disk drive, then no configuration is needed. The system issues a command to end its prosecution and return to the host operating system.

If the first disk drive is detected, it then goes to step 304 to get the configuration information from the disk drive. As shown in FIG. 4, the configuration information from a disk drive includes its associated disk drive group identifier 400, its value in its update counter 402, the volume layout structure in its storage area 404, and its sub-drive locations and sizes in the storage area 406. Step 306 then checks whether the obtained configuration information is valid. This can be done by checking format of the data read from configuration information area on each disk drive. If the configuration information is valid, then step 310 checks if it conflict with that of a certain disk drive group. If there is no conflict, then, as shown in the step 314, this disk drive is integrated into configuration information of its disk drive group. In the case when the configuration information is invalid, then at the step 308, this disk drive is collected into an un-configured disk drive group. These disk drives in the un-configured disk drive group will be used for an automatic rebuilding of RAID data (see FIG. 3(*b*)). In case there is a conflict, then step 312 resolves the conflict by using the configuration information of the disk drive that possesses the largest value in the update counter 402 to configure the RAID configuration of its disk drive group and puts the remaining conflicted disk drives into the un-configured disk drive group. This process is repeated until all disk drives have been completely scanned and processed as the step 318 shows then goes to FIG. 3(*b*).

The result obtained from the steps of FIG. 3(*a*) consists of integrated configuration information from all disk drive groups and information of the un-configured disk drive group. The integrated information describes current layout structure of all volumes with RAID or non-RAID levels in the system. The integrated configuration information may contain referenced disk drives. A referenced disk drive identified in the integrated configuration information is not connected to the system peripheral bus 104. The system initialization time configuration procedure determines whether there are referenced disk drives present. If so, the process uses the un-configured disk drives to replace the referenced drives and rebuilds RAID data into the un-configured disk drives.

A referenced disk drive is the one not connected to the system peripheral bus 104. Although the referenced drives are not connected to the system peripheral bus, but their existences can be obtained from the constituent logical units (volumes) of the configuration information of the existing disk drives. The sub-drives of a referenced drive can be obtained from the analysis of the configuration information of its disk drive group. There are two kinds of referenced drives. One is withdrawn from the system during hot swap at runtime, and the other is undetectable by the system when turned off and then re-boot up. The referenced disk drives of the first kind still retain the completed pieces of information such as their configuration location in the system. Those of the second kind lack such information and so their pieces of information can only be determined by the combination of volume layout structure and sub-drives location and size obtained from disk drives in the same groups with the referenced drive.

Figure 6:
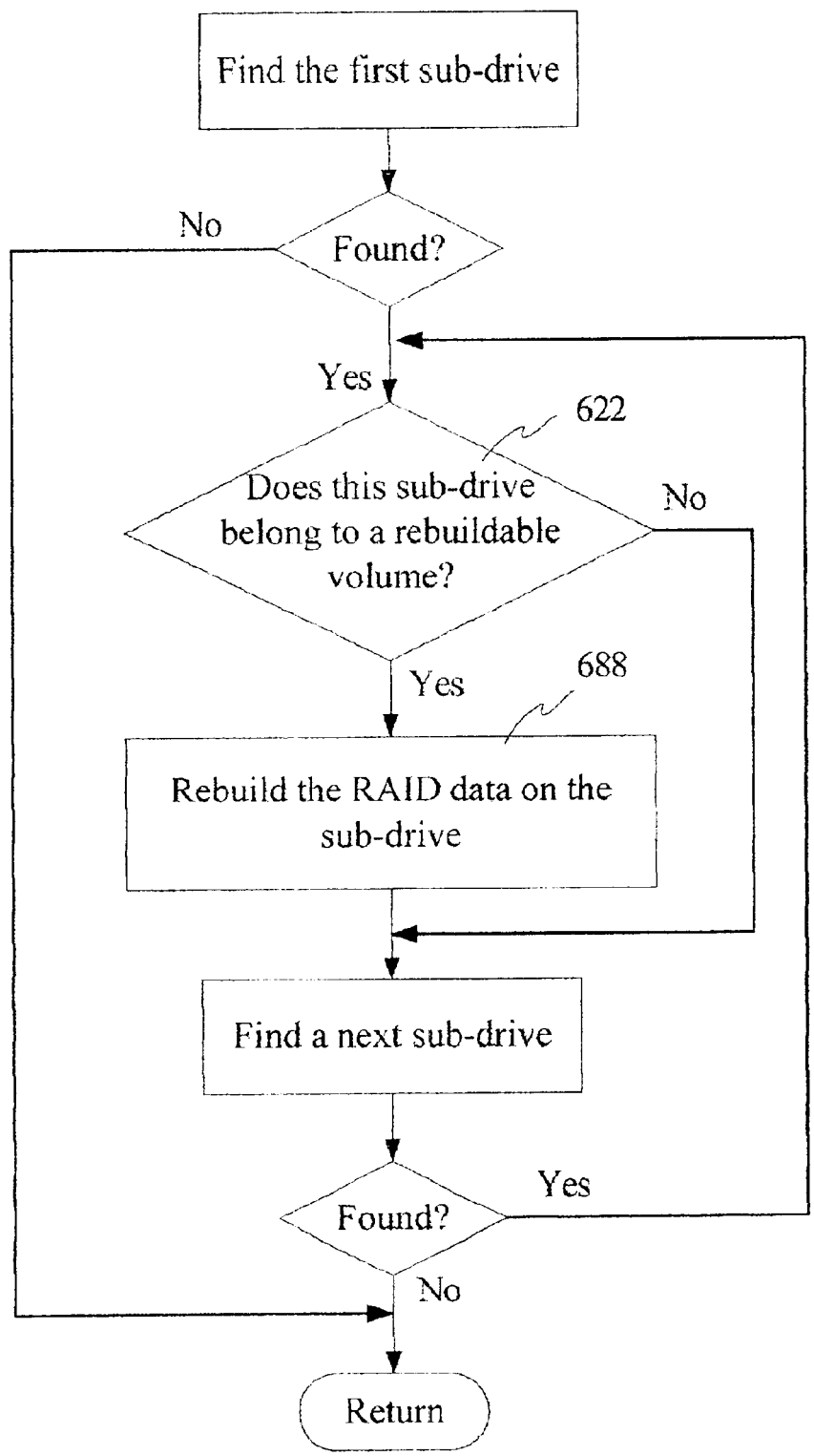
FIG. 6 illustrates the steps of rebuilding the RAID data in accordance with a preferred embodiment of the present invention.

Referring to FIG. 3(*b*), step 320 analyzes the integrated configuration information of the system just obtained from the process loop steps 310, 312, to 308 and to 316 of FIG. 3(*a*). In the case when no referenced disk drive can be found, then the process of system initialization time procedure ends and returns to the host operating system. In the case when at least one referenced drive can be found, then step 324 tries to find from the un-configured drive group a un-configured disk drive, which has enough space to replace the found referenced disk drive. In the case when all conditions are met, then step 326 copies the configuration information of the disk drive group of the one which the referenced disk drive belongs, to the new disk drive and eliminates the referenced disk drive from its group. Then, step 328 starts to perform the rebuilding of RAID data to the un-configured disk drive. The detailed rebuilding process is shown in FIG. 6. As shown in step 330, the above process is repeatedly performed to find all referenced disk drives in the system and to replace them with un-configured disk drives from the un-configured drive group.

Figure 5:
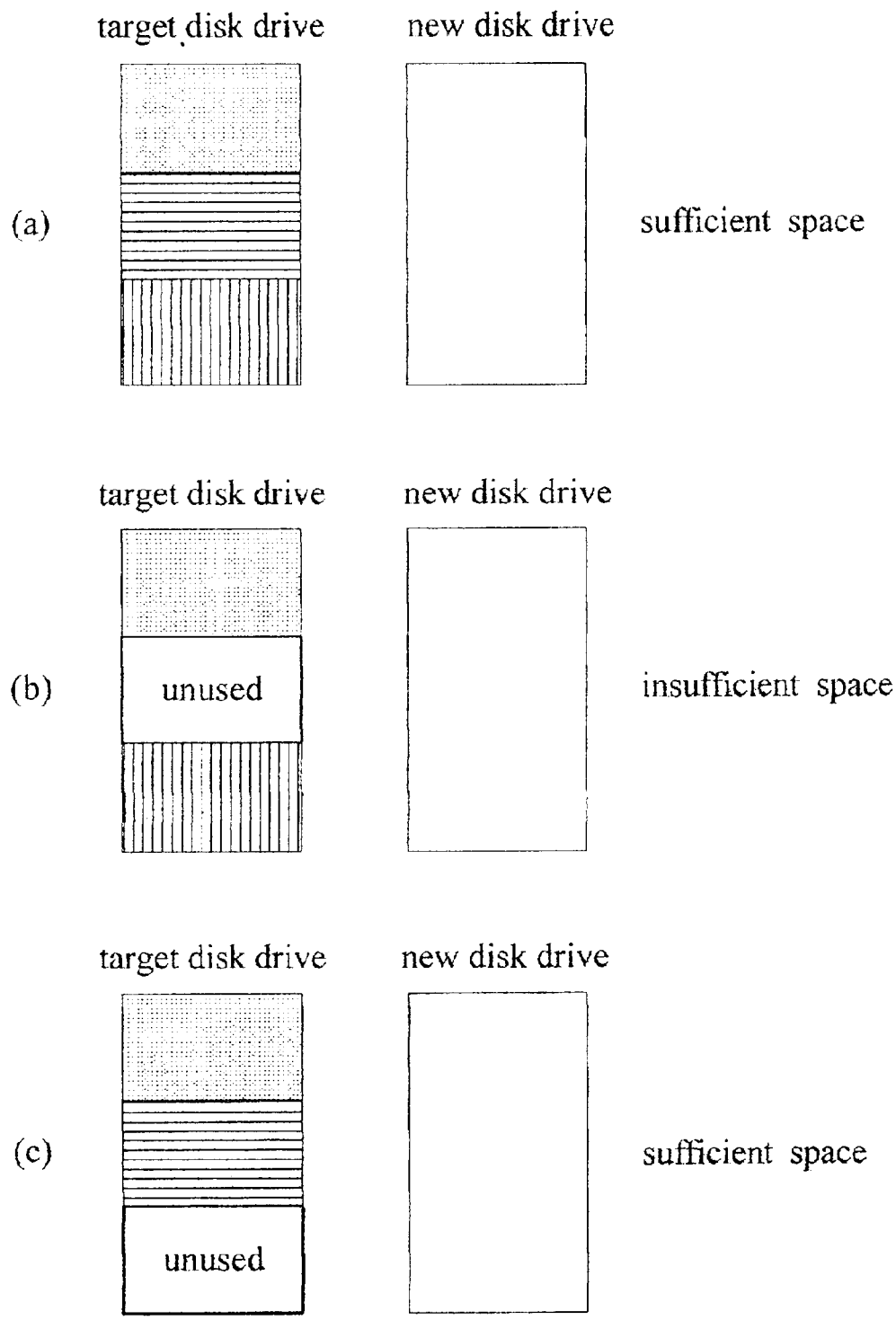
FIG. 5 illustrates exemplary cases of whether a new disk drive has enough space to replace the target disk drive.

FIG. 5 illustrates three possibilities of whether a new disk drive has enough space to replace a target drive. In both cases shown in FIG. 5(*a*) and FIG. 5(*c*), the new disk drives have either just enough or more than enough space to cover the total area of continuous sub-drives in the target disk drives. In the case shown in FIG. 5(*b*), the new disk drive has not enough space to replace the target disk drive, since each sub-drive has its own initial position and covered range in configuring each disk drive, with an unused sub-drive occupying its space.

An active disk drive group is a user labeled disk drive group. They can be used by all systems rooted on top of it. A user can use each of the volumes in an active disk drive group to construct application file systems or data base systems. In a normal case, each configured disk drive connected to the system peripheral bus is valid.—A valid disk drive contains the configuration information satisfied the requirement of a predefined format used in the system. Thus, a brand-new disk drive is invalid because it does not fit to the predefined format.

FIG. 6 shows an automatic process for rebuilding RAID data indicated in the step 328 of FIG. 3(*b*). As shown in the figure, the process starts to select the first sub-drive to rebuild the RAID data in step 688. In the case when there is no such a volume for the rebuilding then, as shown in the step 622, the process begins to select second sub-drives for the rebuilding and so on until there are no longer any sub-drives existing for the rebuilding. A volume that can be rebuilt may be labeled with RAID 1, or RAID 5, or RAID 5 with spare. If it is labeled RAID 1, then the volume must contain at least one sub-drive that functions normally. If it is labeled RAID 5, then it can have at most one abnormal sub-drive. If it is labeled RAID 5 with spare, then the volume can have at most two abnormal sub-drives. The other volumes labeled RAID 0 or non-RAID, have their sub-drives kept intact. In the step 688, if the volume is RAID 1 labeled, it then rebuilds the data of normally functioned sub-drives in the volume to the new disk drive. If the volume is either RAID 5 labeled or RAID 5 with spare labeled, then it performs the parity operation on the normally functioned sub-drives to obtain the correct RAID data for the new disk drive.

Figure 7A:
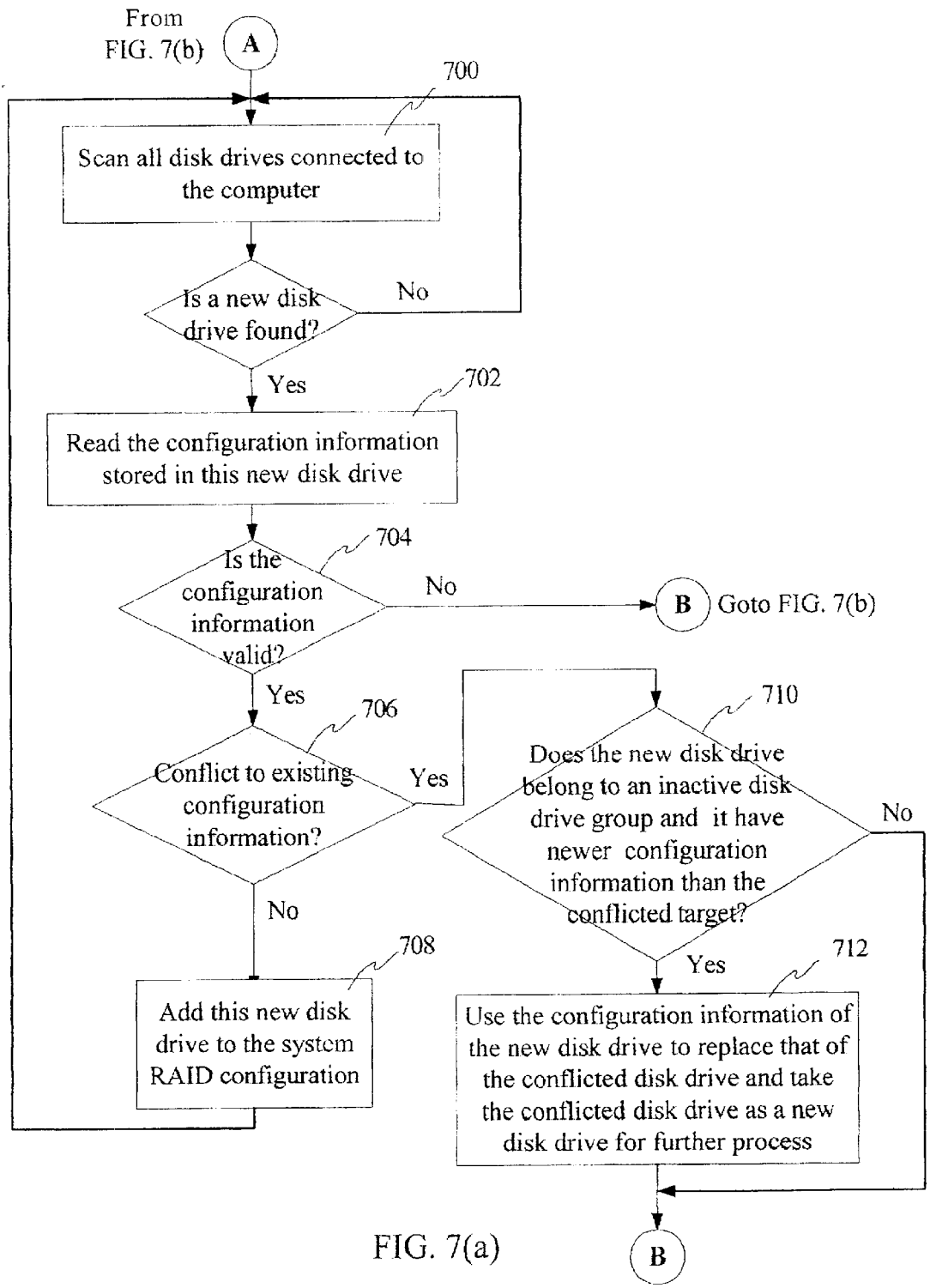
FIGS. 7(a) and 7(b) are flow charts illustrating the steps used in the runtime configuration procedure in accordance with a preferred embodiment of the present invention.
Figure 7B:
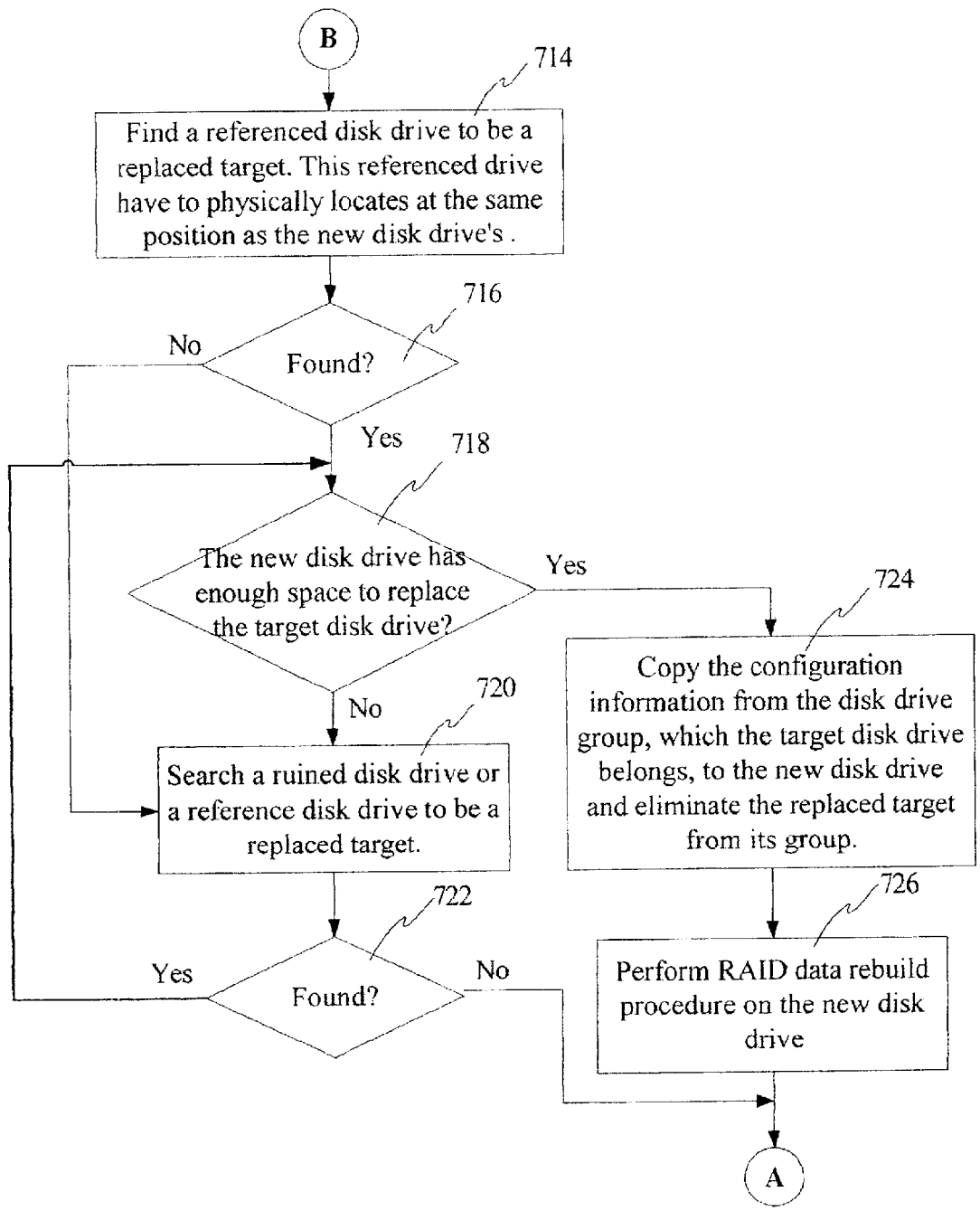

FIG. 7 shows the steps of detecting newly added disk drives, updating the RAID configuration information, and rebuilding RAID data in runtime. This process works only for a system that supports the on-line disk drive swapping. As shown in FIG. 7(*a*), step 700 scans all disk drives connected to the system peripheral bus in runtime. If an added disk drive is detected, then step 702 begins to read the stored configuration information in the disk drive. Then step 704 checks whether the read configuration information is valid or not. This checking process has already been fully described in the discussion of FIG. 3(*a*), above. If the results show that the read configuration is valid, then it proceeds to the next step 706 to further check if it conflicts with that of the existing disk drives. In the case when there is no conflict detected in step 706, then step 708 begins to integrate the newly added disk drive into the system to obtain the updated RAID configuration for the system similar to that described for step 314. In the case when there is a conflict in step 706, then step 710 further checks if the new disk drive and its conflicted disk drive both belong to an inactive disk drive group and the new disk drive has a newer configuration information than the conflicted disk drive. The treatment of a conflict at run time is different to that of system initialization time. The condition of replacing the configuration information of a conflicted disk drive with that of the new added disk drive at run time needs to check if both the conflicted and new disk drives belong to an inactive disk drive group. The reason is because the volumes of an active disk drive group already provide their storage service, the configuration information of the disk drive group cannot be replaced. If the condition is satisfied, then step 712 uses the new disk drive to replace the conflicted disk drive and sets the disk drives with conflicted configuration information as un-configured newly added disk drives for further process. The reason that the configuration information of the new disk is used for the system is because it has a larger update counts than that of its conflict disk drives and so it owns a higher priority to be selected for the representation of a new configuration information.

The result obtained from the process of FIG. 7(*a*) identifies an updated RAID configuration where one new disk drive is added into the system. The process of FIG. 7(*b*) is to look for a referenced drive to be as a target disk drive for each new disk drive obtained in the steps of 704 and 710, when the new disk drive is either brand-new or does not have a newer configuration than its competitive conflicted disk drive. As shown in the figure, step 714 begins to search for a referenced drive as a target that has the same configuration location as the new disk drive. As shown in the steps 716 and 718, if such a target disk drive that satisfies the space condition as described in FIG. 5 can be found, then step 724 copies the configuration information of the disk drive group of the one which the referenced disk drive belongs, to the new disk drive and eliminates the referenced disk drive from its group. Step 726 rebuilds the RAID data to the new disk drive just obtained. This rebuilding process has been fully described in the discussion of the steps of FIG. 6. In the case when no such a target disk drive can be found by step 716, then step 720 is applied repeatedly to find a ruined or a referenced drive that can be the target disk drive. In the case when a qualified target disk drive does not exist, then step 722 issues a jump instruction to return to step 700 for detecting yet another new disk drive in runtime. When the rebuilding of the RAID data of the new disk drive has been done in step 726, then a jump instruction is also issued to return to step 700 to repeat the search of new added disk drives in runtime.

While the invention has been illustrated and described in the drawings and foregoing specification only the preferred embodiments have been discussed. Other equivalent embodiments within the spirit of the invention are therefore envisioned. Nor is it intended by the above description to narrow the scope of the appended claims. The claims themselves recite those features deemed essential for the invention.

I claim:

1. A computer implemented method for automatic updating and rebuilding the RAID configuration and configured data or disk drives in a RAID configured system, wherein said method employs computer implemented procedures to operate a RAID controller in a computer system having a CPU and memory for executing the procedures, disk drives, and a multiple system peripheral bus, comprising:
  a) scanning all disk drive connected to multiple system peripheral bus of a computer system,
  b) detecting by the RAID controller newly added disk drives connected to the system peripheral bus at initiation and runtime that at least one disk drive was added to the RAID controller,
  c) distinguishing configured and un-configured disk drives in groups,
  d) resolving conflict, where conflicted disk drives have the same configured location, by determining the most appropriate location among the conflicted disk drives such that when one disk drive is disconnected from a system and the other disk drive is connected into the system to replace the disconnected drive by choosing the disk drive with higher undate counts as a valid disk drive, and treating the other as an un-configured disk drive,
  e) finding and selecting referenced disk drive in a RAID configuration when newly added disk drives are inserted into a configuration of the system peripheral bus by checking the referenced disk drives with the same physical location as the newly added disk drive if its size is large enough to rebuild RAID data to the newly added disk drive to start the rebuilding procedure, and if not, checking the other referenced disk drives, and finding one with enough space to rebuild RAID data to the newly added disk drives,
  f) copying the configuration information of the disk drive group to the newly added disk drives.
  g) rebuilding the RAID data into newly added disk drives according to RAID levels, and
  h) presenting to the host operating system the disk drive configuration information.

2. The computer implemented method of claim 1, wherein the disk drive configuration information includes at least one identifier to identify a disk drive group, and each disk drive in the group has the same unique disk drive group identifier to distinguish them from disk drives in other groups.

3. The computer implemented method of claim 1, including recording the number of operative configuration times for each disk drive in the system as part of the configuration information with at least one update counter where the initial value of the update counter of a disk drive set at zero and increased by one each time a disk drive is involved in a configuration activity.

4. The computer implemented method of claim 1, wherein the disk drives contain volume layout structure as to each disk drive in a disk drive group, its configured location, and the size of sub-drives of each disk drive in the group.

5. The computer implemented method of claim 4, wherein the configuration information stored in a disk drive is in terms of how the logic units or volumes with RAID levels are formed in association with the disk drive group, where it belongs, and where a volume is formed by the sub-drives with the same RAID level that spans disk drives in the group.

6. The computer implemented method of claim 1, wherein the step of resolving conflict comprises: choosing from among the conflicted disk drives the one having the largest value in its update counter to represent the value of all conflicted disk drives.

7. The computer implemented method of claim 6, including the steps of:
  a. classifying all of the remaining conflicted disk drives not selected as unused, and
  b. putting the remaining conflicted disk drives in an un-configured disk drive group for further processing.

8. The computer implemented method of claim 1, wherein after the referenced disk drive is found, including assigning the newly added disk drive as a target disk drive for copying configuration information of the referenced disk drive to the target disk drive and rebuilding RAID data into the target disk drive according RAID levels, and removing the referenced disk drive from its group.

9. The computer implemented method of claim 8, further comprising: selecting, among the referenced disk drives located in a disk drive group, for each disk drive in the group having a same configuration location of the newly added disk drive, the one with enough space to rebuild RAID data to the newly added disk drive.

10. The computer implemented method of claim 1, wherein the rebuilding the configuration information comprises:
  a) finding the sub-drive in sequential order;
  b) checking if the found sub-drive belongs to a volume with a RAID level that can be rebuilt;
  c) rebuilding the RAID data on the sub-drive, if it belongs to a volume that can be rebuilt; otherwise
  d) iteratively repeating steps a, b, and c until all sub-drives have been checked and rebuilt.

11. A computer implemented method for automatic updating and rebuilding the RAID data and configuration information of disk drives in a RAID configured system at system initialization time, wherein said system includes a CPU and memory with an operating system, disk drives with RAID data and configuration information, configuration information including at least one identifier to identify a disk drive group, and each disk drive in the group has the same unique disk drive group identifier to distinguish them from disk drives in other groups, volume layout structure as to each disk drive in a disk drive group, its configured location, and the size of sub-drives of each disk drive in the group, comprising the steps of:
  a) scanning all disk drives connected to multiple system peripheral bus,
  b) detecting newly added disk drives connected to the system peripheral bus when one disk drive is disconnected from a system and the other disk drive is connected into the system to replace the disconnected drive by choosing the disk drive with higher update counts as a valid disk drive, and treating the other as an un-configured disk drive,
  c) recording the number of operative configuration times for each disk drive in the system as part of the configuration information, with the initial value of the update counter of a disk drive set at zero and increased by one each time a disk drive is involved in a configuration change,
  d) resolving conflict, where conflicted disk drives have the same configured location by determining the most appropriate location among the conflicted disk drives by choosing from among the conflicted disk drives the one having the largest value in its update counter to represent the value of all conflicted disk drives via
    i. classifying all of the remaining conflicted disk drives not selected as unused, and
    ii. putting the remaining conflicted disk drives in an un-configured disk drive group for further process, e) finding referenced disk drives when newly added disk drives are inserted into the system by checking the referenced disk drives with the same physical location as the newly added disk drive if its size is large enough to rebuild RAID data to the newly added disk drive to start the rebuilding procedure, and if not, checking the other referenced disk drives, and finding one with enough space to rebuild RAID data to the newly added disk drive, by
  1) assigning the newly added disk drive as a target disk drive,
  2) copying configuration information of the referenced disk drive to the target disk drive,
  3) rebuilding RAID data into the target disk drive according RAID levels,
  4) removing the referenced disk drive from its group,
  5) rebuilding the RAID data into newly added disk drives via
    i. finding the sub-drive in sequential order;
    ii. checking if the found sub-drive belongs to a volume with a RAID level that can be rebuilt;
    iii. rebuilding the data on the sub-drive, if it belongs to a volume that can be rebuilt; otherwise
    iv. iteratively repeating steps i, ii, and iii until all sub-drives have been checked and rebuilt, and
f) presenting to the host operating system the disk drive configuration information.

12. The computer implemented method of claim 11, wherein the volume layout structure stored in a disk drive is in terms of how the logic units or volumes with RAID levels are formed in association with the disk drive group, where it belongs, and where a volume is formed by the sub-drives with the same RAID level that spans disk drives in the group.

13. The computer implemented method according to claim 11, wherein step b, detecting the inactive disk drive, and step d, resolving conflict, further include:
  a) analyzing configuration information of the system to obtain all referenced disk drives remaining in the system;
  b) finding a referenced disk drive with space that its RAID data can be rebuilt into the newly added disk drive;
  c) copying the configuration information of the disk drive group to the newly added disk drives,
  d) rebuilding the RAID data into newly added disk drives according to RAID levels, and
  e) iteratively repeating steps a through d until all of the referenced disk drives have been completely analyzed, and
  f) returning to the start of the configuration procedure (step a of claim 11).

14. A computer implemented method for automatic updating and rebuilding the RAID data and configuration information of disk drives in a RAID configured computer system having a CPU with associated memory, disk drives and a multiple system peripheral bus at system run time, wherein the run-time configuration procedure for the system supports hot disk drive swapping, further comprises the steps of:
  a) scanning all disk drives connected to the multiple system peripheral bus;
  b) detecting a newly added disk drive and reading the configuration information stored in the detected disk drive when one disk drive is disconnected from a system and the other disk drive is connected into the system to replace the disconnected drive by choosing the disk drive with higher update counts as a valid disk drive, and treating the other as an un-configured disk drive;
  c) checking whether the newly added disk drive is a valid disk drive
  d) checking, in case when added disk drive is valid, if the added disk drive is conflict to an existing disk drive;
  e) checking, in case when the added disk drive is conflicted to an existing disk drive, if the added disk drive belongs to an inactive disk drive group and the added disk drive contains a higher update count than that of the conflicted disk drive;
  f) replacing, in the case when both the added disk drive and the conflicted disk drive belong to an inactive disk drive group but the added disk drive has newer configuration information, the conflicted disk drive by the newly added disk drive and taking the conflicted disk drive as a new disk drive for further processing; or
  g) integrating, in case the added disk drive is valid and has no conflict to any existing disk drive, the configuration information stored in the newly added disk drive to the system configuration;
  h) finding, in the case when the newly added disk drive contains invalid configuration information or is conflicted to existing disk drive with lower update count than that of the conflicted disk drive, a suitable referenced disk drive for further processing by checking the referenced disk drives with the same physical location as the newly added disk drive if its size is large enough to rebuild RAID data to the newly added disk drive to start the rebuilding procedure, and if not, checking the other referenced disk drives, and finding one with enough space to rebuild RAID data to the newly added disk drive; and
  i) iteratively repeating steps a through h during the run time.

15. A computer implemented method according to claim 14, wherein the step h, finding a suitable referenced disk drive, and step f, replacing the conflicted disk, further comprise:
  a) finding a referenced disk drive with a same configuration location of the added disk drive and with space that its RAID data can be rebuilt into the newly added disk drive; otherwise
  b) finding a referenced disk drive, or a ruined disk drive with space that its RAID data can be rebuilt into the newly added disk drive;
  c) copying the configuration information of the disk drive group to the newly added disk drives;
  d) rebuilding the RAID data into newly added disk drives according to RAID levels, and
  e) returning to the start of the procedure (step a of claim 14).

16. A computer software program embedded in a readable storage medium that directs a computer system connected with groups of disk drives to function in a specified manner for rebuilding a RAID configuration, comprising:
  a. examining in sequence all sub-drives associated with a considered disk drives group;
  b. finding the volumes and their associated RAID levels that can rebuild the RAID data by checking the referenced disk drives with the same physical position as the newly added disk drive if its large enough to rebuild RAID data to the newly added disk drive to start the rebuilding procedure, and if not, checking the other referenced disk drives, and finding one with enough space to rebuild RAID data to the newly added disk drive, and c. rebuilding the RAID data based on the current configuration as well as based on the system-encountered situations such as conflict status of disk drives, size of disk drives, and update counts of disk drives when said system discovers a new added disk drive in run-time.

17. A computer software program embedded in a readable storage medium according to claim 16, wherein the RAID configurations associated with each volume consist of simple, span, RAID 0, RAID 1, RAID 5, and RAID 5 with spare, and each RAID level is provided with various protection modes and data storage capacity.

18. A computer software program embedded in a readable storage medium according to claim 16, further including: generating a configuration for un-configured disk drives where the un-configured disk drive configuration includes one or more volumes, and each volume is configured in accordance with a particular RAID level such that the particular RAID level established for each volume after the generation of the configuration may be different than the generation configuration at the system boot-time.

19. An apparatus for automatically updating and rebuilding RAID configuration and RAID data of disk drives in a RAID configured system, comprising:

a. a host computer with CPU associated with an operating system, and memory, b. a computer implemented software program utilizing the host computer and the CPU and operating system to behave a RAID controller, c. a plurality of disk drives with configured locations and data, d. at least one interface storage device operably associated with the CPU, and e. a computer implemented software program stored on the interface storage device including:
 i. means for identifying one or more un-configured disk drives from scanning the disk drives connected to the apparatus and reading their configuration information;
 ii. means for arranging a proper configuration for the un-configured disk drives in accordance with various data types associated with logical disk drives or volumes with RAID levels; and
 iii. means for configuring the un-configured disk drives with RAID levels based on the configuration information, location and size of sub-drives, and the value of update counts associated with each disk drive involved in the configuration.

20. An apparatus for automatically updating RAID configuration and rebuilding RAID data of disk drives according to claim 19, wherein the configuration information stored in a disk drive, whether it is a configured or un-configured, contains an unique disk drive group identifier, and including an update counter that keeps counting the number of operative actions associated with a disk drive, and volume layout structure indicating the configuration location, redundancy type, and size and location of sub-drives.

21. An apparatus for automatically updating RAID configuration and rebuilding RAID data of disk drives according to claim 19, wherein said means for arranging a proper configuration for the un-configured disk drives comprises insuring that:

a. the volume contains at least one normally functioning sub-drive when operating a RAID 1 level, b. the volume has at most one abnormally functioned sub-drive in operating RAID 5 level, c. the volume can have at most two abnormally functioning sub-drive in operating a RAID 5 with spare, and d. the volume is kept intact in operating RAID 0, simple, and span.

22. An apparatus for automatically updating and rebuilding RAID configuration and configured data of disk drives according to claim 19, wherein the means for configuring the un-configured disk drives include:

a) means for identifying one or more valid configurations of disk drives having a configuration information stored thereupon;

b) means for finding a target disk drive to copy configuration information to a newly added disk drive;

c) means for rebuilding RAID data for the newly added disk drive; and d) means for returning to the host operating system.

* * * * *